United States Patent [19]

Itoh et al.

[11] Patent Number: 4,912,934

[45] Date of Patent: Apr. 3, 1990

[54] HERMETICALLY CLOSED CIRCULATION TYPE, VAPOR ABSORPTION REFRIGERATOR

[75] Inventors: Masahiko Itoh, Hitachiota; Heihatiro Midorikawa; Kazutoshi Itoh, both of Hitachi; Yasumasa Furutani, Katsuta; Michihiko Aizawa, Ushiku, all of Japan

[73] Assignee: Hitachi, Ltd., Tokyo, Japan

[21] Appl. No.: 253,574

[22] Filed: Oct. 5, 1988

[30] Foreign Application Priority Data

Oct. 5, 1987 [JP] Japan .................... 62-249835

[51] Int. Cl.$^4$ ............................................. F25B 15/00
[52] U.S. Cl. ........................................ 62/112; 62/474; 62/476; 62/DIG. 20; 165/133; 427/230
[58] Field of Search ................. 62/101, 112, 474, 476, 62/DIG. 20; 165/133, 134.1, 914; 427/230, 237, 239

[56] References Cited

U.S. PATENT DOCUMENTS

| | | | |
|---|---|---|---|
| 2,476,345 | 7/1949 | Zavarella | 62/DIG. 20 |
| 2,755,170 | 7/1956 | Stubblefield et al. | 62/DIG. 20 |
| 3,101,277 | 8/1963 | Eder et al. | 62/DIG. 20 |
| 4,311,024 | 1/1982 | Itoh et al. | 62/474 |
| 4,487,036 | 12/1984 | Itoh et al. | 62/474 |
| 4,644,907 | 2/1987 | Hunter | 165/133 X |
| 4,760,878 | 8/1988 | Fukui et al. | 165/133 X |
| 4,795,662 | 1/1989 | Kreiselmaier | 427/230 |

FOREIGN PATENT DOCUMENTS

| | | |
|---|---|---|
| 4011550 | 1/1962 | Japan . |
| 4226917 | 1/1962 | Japan . |
| 45-1711 | 1/1970 | Japan . |
| 45-25954 | 8/1970 | Japan . |
| 60-29872 | 7/1985 | Japan . |

OTHER PUBLICATIONS

English Abstract of Japanese Patent Applications Kokai (Laid-Open), Nos. 58-224186 and 58-224187.

Primary Examiner—Lloyd L. King
Attorney, Agent, or Firm—Antonelli, Terry & Wands

[57] ABSTRACT

A hermetically closed circulation type, vapor absorption refrigerator which comprises a high temperature regenerator, a low temperature regenerator a condenser, an evaporator, an absorber and heat exchangers in a hermetically closed circulation system as essential constituent members composed of iron-based materials, where refrigeration is produced by repetitions of concentration of an absorbing solution sealed into the circulation system, dilution with a cooling medium and heat exchange, the inside wall of the high temperature regenerator being provided with a composite film of molybdenum oxides and iron oxide can be operated stably with a high reliability or corrosion resistance.

17 Claims, 2 Drawing Sheets

POTENTIAL-ph DIAGRAM OF Fe-Mo-H₂O SYSTEM (150°C)

HERMETICALLY CLOSED CIRCULATION TYPE, VAPOR ABSORPTION REFRIGERATOR

BACKGROUND OF THE INVENTION

This invention relates to a vapor absorption refrigerator and, more particularly, to a hermetically closed circulation type, vapor absorption refrigerator of outstanding corrosion resistance, where the essential constituent member of the refrigerator is highly protected from corrosion by forming an anti-corrosive film on the surface of the essential constituent member.

The hermetically closed circulation type, vapor absorption refrigerator is operationally kept at a pressure less than the atmospheric pressure and thus generally utilizes water as a cooling medium and an aqueous concentrated LiBr solution as an absorbing solution. Generally, with a higher concentration of the absorbing solution, a higher refrigeration efficiency of the vapor absorption refrigerator can be obtained. For example, at the component at the highest temperature in a double effect vapor absorption refrigerator, that is, at the regenerator, the absorbing solution has a temperature of about 160° C. and an LiBr concentration of 62%. On the other hand, the corrosiveness of the aqueous LiBr solution upon metals increases with higher temperature and concentration. Thus, the essential constituent member of the refrigerator, particularly the regenerator, is vigorously corroded without adding an appropriate inhibitor to the absorbing solution.

The inhibitors so far often used are inorganic oxidizing agents, and chromates, nitrates, molybdates, tungstates, etc. are well known oxidizing agents. These oxidizing agents are used together with an alkali metal hydroxide as a pH-controlling agent and the corrosion of the essential constituent member is suppressed by formation of a film on the surface of the essential constituent member through their oxidizing action.

Thus, an oxidizing agent having a strong oxidizing action is desirable for effectively preventing the corrosion, and chromates and nitrates have been often used for this purpose. The molybdates have a weak oxidizing action and a very low solubility in the absorbing solution and thus it is difficult to obtain the necessary concentration for the film formation. Therefore, the molybdates are not satisfactory for forming a anti-corrosive film. Furthermore, the molybdates require much more time to form a stable anti-corrosive film, and the essential constituent member is exposed to corrosion long before the formation of the film, thereby generating a hydrogen gas and lowering the refrigeration efficiency. That is, it is difficult to obtain a satisfactory anti-corrosive effect.

It has been also proposed to use organic inhibitors, but it is difficult to form a rigid film on the surface of the essential constituent member. Furthermore, the organic inhibitors do not have a satisfactory heat stability and also are liable to undergo selective dissolution in a higher alcohol as added to improve the heat transfer effect, thereby lowering the anti-corrosive effect.

The vapor absorption refrigerators, absorbing solutions and protection of the vapor absorption refrigerators from corrosion are disclosed, for example, in Japanese Patent Publications Nos. 45-1711, 45-25954, 42-26917, 40-11550 and 60-29872. Particularly, anti-corrosive aqueous LiBr solutions are disclosed in Japanese Patent Applications Kokai (Laid-open) Nos. 53-25288, 58-224186 and 58-224187. This prior art is directed to oxidation of the surfaces of the constituent members of a vapor absorption refrigerator to form an anti-corrosive film and consequently control the corrosion of the constituent members. In other words, corrosion of iron-based materials for the constituent members under the most severe corrosion conditions and inhibitor effects have been thoroughly taken into account in the prior art and thus various inhibitors have been proposed. However, advance formation of an anti-corrosive film on the surface of the essential constituent member of a vapor absorption refrigerator, i.e. before the refrigerator is placed into the refrigerating cycle, or the structure of the film for effectively preventing corrosion of the essential constituent member has not been taken into account in the prior art. Thus, no satisfactory reliability has been obtained against the corrosion. Furthermore, single operation of a high temperature regenerator of the vapor absorption refrigerator with a specific film-forming solution to form an anti-corrosive film on the inside wall of the high temperature regenerator exposed to a vigorous corrosion has not been taken into account in the prior art.

SUMMARY OF THE INVENTION

An object of the present invention is to provide a process for intensively forming an anti-corrosive film on the inside wall of only a high temperature regenerator to be exposed to the most severe corrosion conditions in a hermetically closed circulation type, vapor absorption refrigerator by treating the inside wall with a film forming solution in advance of the refrigerating operation using an absorbing solution.

Another object of the present invention is to provide a hermetically closed circulation type, vapor absorption refrigerator with a high anti-corrosion effect, where an anti-corrosive film is formed on the inside wall of a high temperature regenerator to be exposed to the most severe corrosion conditions in advance by treating the inner wall with a film forming solution.

Another object of the present invention is to provide a hermetically closed circulation type, vapor absorption refrigerator of high anti-corrosiveness, using an aqueous LiBr-based absorbing solution.

By forming an anti-corrosive film on the inside wall of the high temperature regenerator of a hermetically circulation type refrigerator in advance, the refrigerator can be stably operated even from the initial period of the refrigerating operation without any fear of corrosion of the high temperature regenerator and of lowering the refrigeration efficiency of the refrigerator.

The film-forming solution for use in the present invention is an aqueous solution containing molybdate ions with a pH of 7.5 to 11, and the anti-corrosive film is formed from the film-forming solution at a temperature of its boiling point or higher.

In a hermetically closed circulation type, vapor absorption refrigerator which comprises a high temperature regenerator, a low temperature regenerator, a condenser, an evaporator, an absorber and heat exchangers in a hermetically closed circulation system as essential constituent members composed of iron-based materials as constituent materials, where refrigeration is produced by repetitions of concentration of an absorbing solution sealed into the circulation system, dilution with a cooling medium and heat exchange, the inside wall of the high temperature regenerator is provided with a composite oxide film of molybdenum oxides and iron oxide, and the molybdenum oxides are richer in the composite oxide film toward the side in contact with the absorbing solution from the wall side of the high temperature regenerator, and the iron oxide is preferably gradually richer toward the inside wall of the high temperature regenerator from the side in contact with the absorbing solution.

The composite oxide film is formed on the inside wall of the high temperature regenerator composed of iron-based material by sealing a film-forming solution into the high temperature regenerator and conducting a film-forming operation of the high temperature regenerator in advance, or by making the high temperature regenerator from constituent members having the composite oxide film formed on one side in advance. That is, a composite oxide film composed of molybdenum oxides and iron oxide can be formed on the inside wall of a high temperature regenerator made from an iron-based material by providing the high temperature regenerator with a film-forming solution recycle line and a cooling medium supply line, sealing an aqueous solution containing molybdate ions and a pH of 7.5 to 11 as a film-forming solution into the high temperature regenerator, and subjecting the high temperature regenerator to a circulating operation with the film-forming solution at the boiling point of the film-forming solution or higher. The circulating operation may be hereinafter referred to also as "film-forming operation". The corrosion resistance of a hermetically closed circulation type, vapor absorption refrigerator can be remarkably improved by forming a composite oxide film containing molybdenum oxides at a higher concentration.

In order to form the composite oxide film on the inside wall of a high temperature regenerator exposed to the most severe corrosion conditions by the film forming operation of the high temperature regenerator, the high temperature regenerator is provided with a film-forming solution recycle line and a cooling medium supply line and subjected to the film-forming operation with the film-forming solution without operating the entire refrigerator, thereby forming a composite oxide film as an anti-corrosive film on the inside wall of the high temperature refrigerator and also on the inside surfaces of piping and valve in the recycle line provided on the high temperature regenerator. Thus, in the film-forming operation, the film-forming solution heated in the high temperature refrigerator recyclically flows through the film-forming solution recycle line to form the composite oxide film on the surfaces in contact with the film-forming solution.

The cooling medium supply line serves to return the water vapor generated from the film-forming solution by the film-forming operation of the high temperature regenerator, upon condensation to liquid water (cooling medium) in the condenser, to the high temperature regenerator, thereby keeping the concentration of the film-forming solution constant. The film-forming operation of the high temperature regenerator can be carried out with the film-forming solution at constant concentration and temperature, whereby the composite oxide film can be formed on the inside wall of the high temperature regenerator before the refrigerating operation of the refrigerator.

Molybdate is dissociated into $MoO_4^{2-}$ ions in the film-forming solution, and $MoO_4^{2-}$ ions are deposited as a molybdenum oxide film on the inside wall of the high temperature regenerator to suppress the corrosion. The molybdenum oxides in the thus formed film usually exist as $MoO_2$ and $MoO_3$ and have a very strong resistance to the attacking action of halogen ions such as $Br^-$ in the absorbing solution. Thus, the composite oxide film formed on the surface of iron-based material is hardly susceptible to local damages and shows an outstanding resistance to pitting corrosion.

The molybdate in the film-forming solution is dissociated into $MoO_4^{2-}$ ions, which oxidizes the surface of iron-based material by virtue of its oxidizing action to form an iron oxide. $MoO_4^{2-}$ ions not only have the oxidizing action, but are also deposited as a molybdenum oxide film on the surface of the iron-based material, as described before.

Furthermore, the molybdenum oxides exist richer in the composite oxide film toward the outer side, i.e. the side in contact with the absorbing solution, and this is quite preferable for preventing the film from localized damages, and the anti-corrosion effect of the composite oxide film against halogen ions can be remarkably increased by the presence of $MoO_2$ and $MoO_3$ in the film.

The film-forming solution is withdrawn from the high temperature regenerator after the film-forming operation of the high temperature regenerator, but a small amount of the film-forming solution remaining in the regenerator does not adversely affect the successive refrigerating operation of the refrigerator with an absorbing solution.

As described above, a composite oxide film composed of molybdenum oxides and iron oxide has a good corrosion resistance and a hermetically closed circulation type, vapor absorption refrigerator, where such a composite oxide film is formed on the inside wall of the high temperature regenerator, has a considerably high corrosion resistance. That is, when an aqueous LiBr solution containing a small amount of alkali hydroxide and a very small amount of molybdate and nitrate as an absorbing solution is sealed into the hermetically closed circulation type, vapor absorption refrigerator with a high temperature regenerator, whose inside wall is provided with such a composite oxide film, and the refrigerator is subjected to refrigerating operation, the corrosion resistance is considerably improved, as compared with a refrigerator with a high temperature regenerator whose inside wall has no such a composite oxide film. An absorbing solution containing a higher alcohol such as octyl alcohol content, etc. for improving the heat transfer of the heat exchanger can be also used in the present refrigeration with the same effect as the LiBr absorbing solution containing no such higher alcohol content. That is, the presence of such a higher alcohol in the LiBr absorbing solution has no adverse effect upon the corrosion resistance of the present refrigerator. The amount of such a higher alcohol content to be added to the LiBr absorbing solution is 0.2 to 3% by weight.

DETAILED DESCRIPTION OF THE INVENTION

Figure 1:
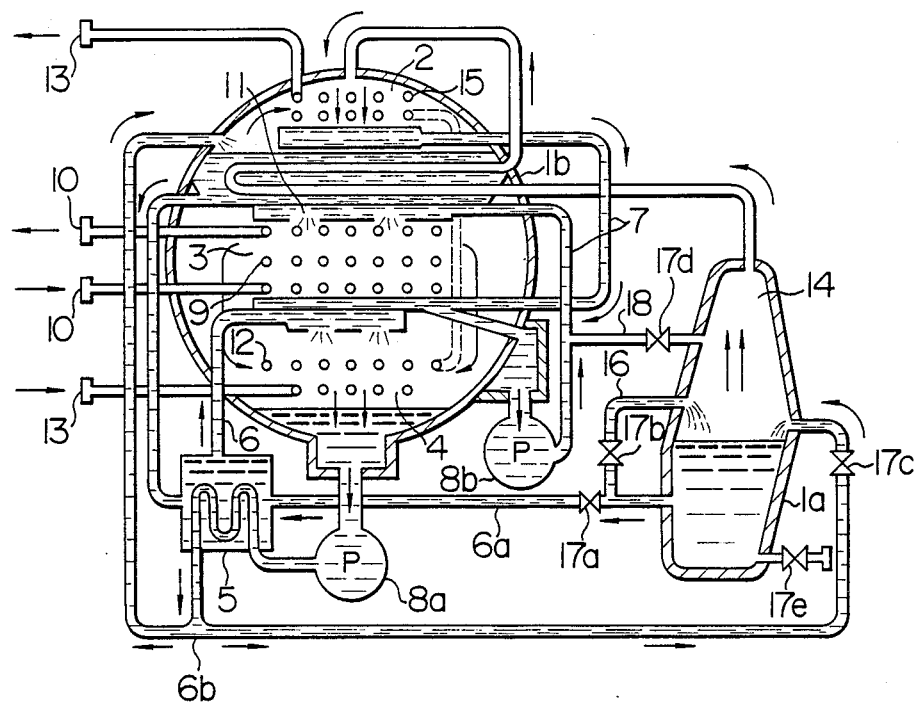
FIG. 1 is a flow diagram of a hermetically closed circulation type, vapor absorption refrigerator according to one embodiment of the present invention.

One embodiment of the present invention will be described in detail below, referring to FIG. 1.

Refrigerating operation of a hermetically closed circulation type, vapor absorption refrigerator is carried out in the following manner.

An absorbing solution 6 is heated and concentrated in a high temperature regenerator 1a to separate water vapor 14 from the absorbing solution 6. The water vapor 14 is passed through a heat exchanger in a low temperature regenerator 1b to heat and concentrate a dilute solution 6b in the low temperature regenerator 1b and led to a condenser 2, where the water vapor 14 is cooled and condensed into water with cooling water 15. The thus obtained condensed water acts as a cooling medium 11. The cooling medium 11 is pumped to an evaporator 3 by a cooling medium pump 8b and sprayed over an evaporation pipe 9. The sprayed cooling medium 11 is evaporated again into water vapor, because the evaporator inside is kept in reduced pressure of a few mm Hg. The cold water 10 passing through the evaporation pipe 9 is cooled by the latent heat of evaporation generated by the evaporation of the cooling medium 11 into water vapor, and the cooled cold water is used for air conditioning. The evaporated cooling medium 11, i.e. the water vapor, is led to an absorber 4, where the absorbing solution 6a concentrated in the high temperature regenerator 1a is sprayed and the water vapor is absorbed into the sprayed concentrated absorbing solution 6a. The concentrated absorbing solution becomes hot by the heat generated when the water vapor is absorbed into the concentrated absorbing solution, and the hot absorbing solution diluted by the absorption of water vapor is cooled with cooling water 13 passing through a cooling pipe 12, whereby a dilute absorbing solution 6b is obtained. The dilute absorbing solution 6b is pumped to the high temperature regenerator 1a and the low temperature regenerator 1b through a heat exchanger 5 by a pump 8a.

A recycle piping 16 provided at the high temperature regenerator 1a is not used in the refrigerating operation by closing a valve 17b.

When an anti-corrosive film, i.e. a composite oxide film is formed on the inside wall of the high temperature regenerator 1a by single operation of the high temperature regenerator 1a, valves 17a and 17c are closed, and a valve 17e is opened. After the regenerator 1a is confirmed to be empty, a film-forming solution containing molybdate ions with a pH of 9 to 11 is introduced into the regenerator 1a up to a predetermined level through the valve 17e and then the valve 17e is closed and the valve 17b is opened. The film-forming solution thus sealed into the regenerator 1a is recycled in the regenerator 1a through the recycle piping 16 while heating the film-forming solution to its boiling point or higher. Water vapor 14 generated by the heating of the film-forming solution is condensed into water as the cooling medium 11 in the condenser 2. Then, the cooling medium 11 is returned to the regenerator 1a through a cooling medium supply piping 18 by opening a valve 17d in the piping 18, whereby the film-forming solution in the regenerator 1a can be kept at a constant concentration and an anti-corrosive film is formed on the inside wall of the regenerator 1a.

By the foregoing film-forming operation of the high temperature regenerator 1a above, a composite oxide film having a good corrosion resistance can be formed on the inside wall of the high temperature regenerator to be exposed to the most severe corrosion conditions in the vapor absorption refrigerator, and the corrosion problems due to the refrigerating operation of the vapor absorption refrigerator can be overcome.

Figure 2:
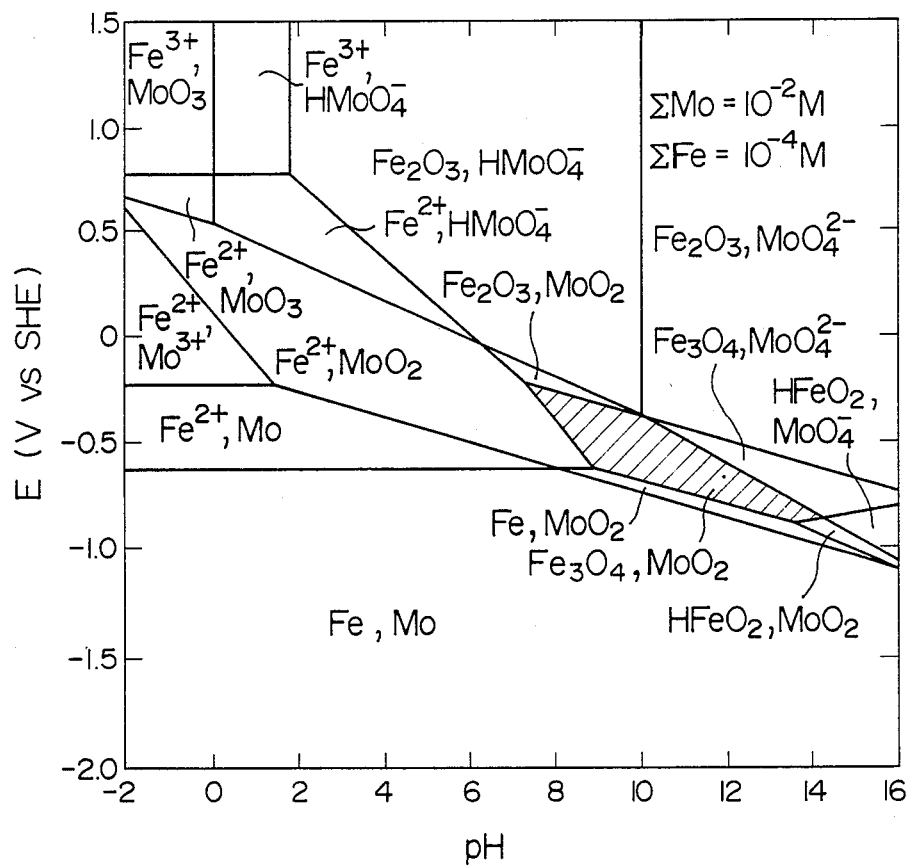
FIG. 2 is a potential-pH diagram of Fe-Mo-$H_2O$ system, which forms a composite oxide film of $Fe_3O_4$ and $MoO_2$ at 150° C.

Furthermore, the composite oxide film can be also formed on the inside wall of the high temperature refrigerator in the following manner. Constituent members of a high temperature refrigerator are defatted and cleaned as they are, and then washed with an acid to remove scales from the surfaces of the constituent members. Then, the constituent members are immersed in a film-forming solution containing molybdate ions with a pH of 9 to 11 with heating. The film-forming operation by immersion is preferably carried out in an immersion tank under a pressure of 50 to 60 kg/cm$^2$ at a temperature of 130° C. or higher. Below 130° C., Fe$_3$O$_4$ is hardly formed on the surfaces of the constituent members of ion-based material. It is necessary to make the pH of the film-forming solution alkaline and control the potential on the surfaces of the constituent members of iron-based material. That is, a combination of a pH of 7.5 to 11 and a potential of $-210$ to $-810$ mV (versus standard hydrogen electrode), preferably a combination of a pH of 9 to 11 and a potential of $-440$ to $-650$ mV, is used, whereby a composite oxide film composed of Fe$_3$O$_4$ and MoO$_2$ can be formed on the surfaces of the constituent members at 150° C., as shown by the hatching region in FIG. 2. By making a high temperature regenerator from the thus treated constituent members, corrosion troubles of a vapor absorption type refrigerator can be overcome during the refrigerating operation.

EXAMPLE 1

A hot rolled steel plate, 400 mm×600 mm×5 mm thick, was dripped in trichloroethylene at 50° C. for 2 minutes to defat the steel plate. Then, the defatted steel plate was dipped in an aqueous 10% hydrochloric acid solution containing an inhibitor at 70° C. for 3 minutes to remove oxide scales from the surface through dissolution. Then, the steel plate was dipped in a film-making tank filled with an aqueous 10% lithium molybdate solution whose pH was adjusted to 10 with NaOH, and the tank was tightly closed and heated at 150° C. for 10 hours while applying a surface potential of $-500$ mV (versus standard hydrogen electrode) to the steel plate. After the film-making treatment, the steel plate was assayed by X-ray diffraction and Auger electron spectroscopy, and it was found that a composite oxide film of Fe$_3$O$_4$ containing MoO$_2$ was formed on the surface of the steel plate.

EXAMPLE 2

An aqueous 20% lithium molybdate solution, whose pH was adjusted to 10 with NaOH, was sealed as a film-forming solution into the high temperature regenerator of a hermetically sealed circulation type, absorption refrigerator provided with a film-making solution recycle line and a cooling medium supply line, as shown in FIG. 1, and only the high temperature regenerator was subjected to a film-forming operation at the boiling point of the solution for 100 hours to form a composite oxide film on the inside wall of the regenerator. Then, the aqueous lithium molybdate solution was discharged from the regenerator, and the regenerator was washed with water and drained.

Figure 3:
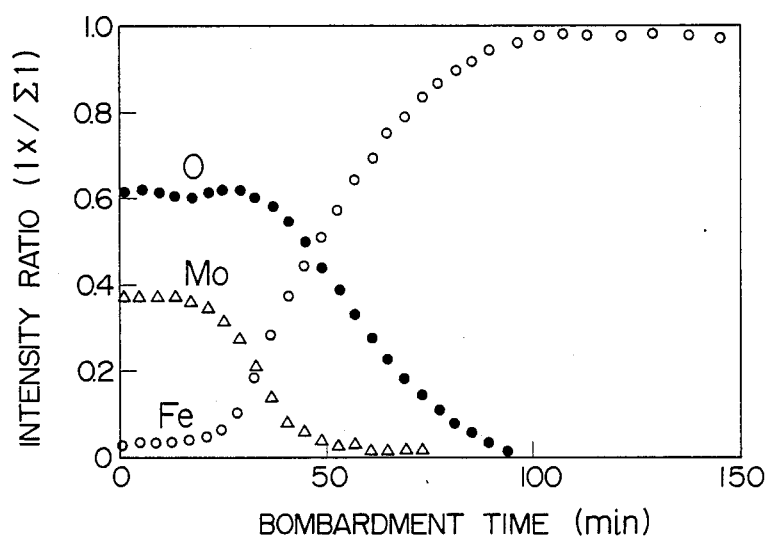
FIG. 3 is a profile diagram showing Mo and Fe concentrations in a composite oxide film formed on the carbon steel inside wall of a high temperature regenerator.

The composite oxide film formed on the inside wall of the regenerator was assayed by Auger electron spectroscopy to determine component concentration distribution in the depth direction. The results are shown in FIG. 3, where the axis of abscissa shows the depth of the film. Bombardment time zero (0) means the outer surface of the film, and the larger the bombardment time means the more inward point in the film, i.e. the point nearer to the inside wall. As is obvious from FIG. 3, much more Mo and much less Fe exist in the region nearer to the side to be in contact with an absorbing solution. It is apparent that molybdenum oxides such as $MoO_2$ and $MoO_x$ exist much more in the region near to the surface of the composite oxide film, whereas $Fe_3O_4$ exists much more inwardly in the film.

EXAMPLE 3

One of the following absorbing solutions usually used in the refrigerating operation was sealed into the hermetically closed circulation type, vapor absorption refrigerator having the high temperature regenerator subjected to the film-forming operation in Example 2 and the refrigerator was operated under full load for 200 hours and a volume of $H_2$ gas generated within the regenerator was measured at every 20 hours to determine an average $H_2$ gas generation rate.

The results are shown in the following Table.

| Absorbing solution A: | LiBr | 50–70 wt. % |
|---|---|---|
| | LiOH | 0.05–1.0 wt. % |
| | $Li_2MoO_4$ | 10–150 ppm as $MoO_4^{2-}$ |
| | $LiNO_3$ | 5–350 ppm as $NO_3^{-}$ |
| | The balance: | water |
| Absorbing solution B: | LiBr | 50–70 wt. % |
| | LiOH | 0.05–1.0 wt. % |
| | $Li_2MoO_4$ | 10–400 ppm as $MoO_4^{2-}$ |
| | sec-octyl alcohol | 0.2–3.0 wt. % |
| | The balance: | water |
| Absorbing solution C: | LiBr | 50–70 wt. % |
| | LiOH | 0.05–0.5 wt. % |
| | $LiNO_3$ | 50–350 ppm as $NO_3^{-}$ |
| | The balance: | water |

TABLE

| Absorbing solution | Average $H_2$ gas generation rate (ml/min) |
|---|---|
| A | 0.03 |
| B | 0.03 |
| C | 0.05 |

On the other hand, when refrigerating operation was carried out in the refrigerator with no composite oxide film on the inside wall of the high temperature regenerator, the average $H_2$ Gas generation rate was about 0.15 ml/min with any one of the absorbing solutions A, B and C.

As is apparent from the foregoing, the average $H_2$ gas generation rate is lower when the refrigerator with the composite oxide film formed on the inside wall of the high temperature regenerator is subjected to the refrigerating operation with the absorbing solutions usually used. Since the $H_2$ gas generation is due to corrosion of the iron-based materials of the constituent members of the refrigerator, it is apparent that the present hermetically closed circulation type, vapor absorption refrigerator has a considerably improved corrosion resistance.

According to the present invention, a hermetically closed circulation type, vapor absorption refrigerator can be provided by forming in advance an anti-corrosive film only on the inside wall of the high temperature regenerator, which is to be exposed to the most severe corrosion conditions.

What is claimed is:

1. A process for forming an anti-corrosive film on the inside wall of a high temperature regenerator of a hermetically closed circulation type, vapor absorption refrigerator comprising a high temperature regenerator, a low temperature regenerator, a condenser, an evaporator, an absorber and heat exchangers in a hermetically closed circulation system as essential constituent members composed of iron-based materials, which comprises providing a solution recycle line and a cooling medium supply line to the high temperature regenerator, sealing an aqueous solution containing molybdate ions and having a pH of 7.5 to 11 as a film-forming solution into the high temperature regenerator in advance to a refrigerating operation, recycling the film-forming solution in the high temperature regenerator through the solution recycle line while heating the high temperature refrigerator and supplying a cooling medium to the high temperature regenerator in an amount to balance the amount of water vapor evaporated from the film-making solution through the cooling medium supply line, thereby subjecting the high temperature regenerator to a film-forming operation and forming an anti-corrosive film on the inside wall of the high temperature regenerator, then closing the solution recycle line and the cooling medium supply line and withdrawing the film-forming solution from the high temperature regenerator.

2. A process according to claim 1, wherein the heating of the high temperature regenerator is carried out at the boiling point or higher of the film-forming solution.

3. A process according to claim 1, wherein the anti-corrosive film is a composite oxide film of molybdenum oxides and iron oxide.

4. A process according to claim 3, wherein the composite oxide film is richer in the molybdenum oxides outwardly from the inside wall in the film.

5. A process according to claim 3, wherein the composite oxide film is richer in the iron oxide inwardly toward the inside wall in the film.

6. A process for forming an anti-corrosive film on the inside wall of a high temperature regenerator of a hermetically closed circulation type, vapor absorption refrigerator comprising a high temperature regenerator, a low temperature regenerator, a condenser, an evaporator, an absorber and heat exchangers in a hermetically closed circulation system as essential constituent members composed of iron-based materials, which comprises introducing a film-making solution into the high temperature regenerator and heating the high temperature regenerator in the presence of the film-making solution, thereby forming an anti-corrosive film on the inside wall of the high temperature regenerator.

7. A process according to claim 6, wherein the heating of the high temperature regenerator is carried out at the boiling point or higher of the film-forming solution.

8. A process according to claim 6, wherein the anti-corrosive film is a composite oxide film of molybdenum oxides and iron oxide.

9. A process according to claim 8, wherein the composite oxide film is richer in the molybdenum oxides outwardly from the inside wall in the film.

10. A process according to claim 8, wherein the composite oxide film is richer in the iron oxide inwardly toward the inside wall in the film.

11. A hermetically closed circulation type, vapor absorption refrigerator which comprises a high temperature regenerator, a low temperature regenerator, a condenser, an evaporator, an absorber and heat exchangers in a hermetically closed circulation system as essential constituent members composed of iron-based materials, where refrigeration is produced by repetitions of concentration of an absorbing solution sealed into the circulation system, dilution with a cooling medium and heat exchange, and recycle piping being provided at the high temperature regenerator, thereby passing a film-making solution in a liquid state through the high temperature regenerator and forming an anti-corrosive film on an inside wall of the high temperature regenerator.

12. A hermetically closed circulation type vapor absorption refrigerator according to claim 11 wherein the anti-corrosive film is a composite oxide film richer in molybdenum oxides than in other oxides outwardly from the inside wall in the film.

13. A hermetically closed circulation type vapor absorption refrigerator according to claim 11, wherein the anti-corrosive film is a composite oxide film richer in iron oxide than in other oxides inwardly toward the inside wall of the film.

14. A hermetically closed circulation type vapor absorption refrigerator according to claim 11, wherein the absorbing solution is an aqueous lithium bromide solution containing a small amount of an alkali hydroxide and at least one of very small amounts of molybdate and nitrate and a small amount of a higher alcohol.

15. A hermetically closed circulation type, vapor absorption refrigerator according to claim 11, wherein the absorbing solution is an aqueous absorbing solution containing 50 to 70% by weight of LiBr, 0.05 to 1.0% by weight of LiOH, 10 to 150 ppm of $Li_2MoO_4$ as $MoO_4^{2-}$, and 5 to 350 ppm of $LiNO_3$ as $NO_3^-$, the balance being water.

16. A hermetically closed circulation type, vapor absorption refrigerator according to claim 11, wherein the absorbing solution is an aqueous absorbing solution containing 50 to 70% by weight of LiBr, 0.05 to 1.0% by weight of LiOH, 10 to 400 ppm of $Li_2MoO_4$ as $MoO_4^{2-}$, and 0.2 to 3% by weight of sec-octyl alcohol, the balance being water.

17. A hermetically closed circulation type, vapor absorption refrigerator according to claim 11, wherein the absorbing solution is an aqueous absorbing solution containing 50 to 70% by weight of LiBr, 0.05–0.5% by weight of LiOH and 50 to 350 ppm of $LiNO_3$ as $NO_3^-$, the balance being water.

* * * * *